United States Patent
Park et al.

(10) Patent No.: US 12,243,116 B2
(45) Date of Patent: Mar. 4, 2025

(54) REPORT DATA CONVERGENCE ANALYSIS SYSTEM AND METHOD FOR DISASTER RESPONSE

(71) Applicant: ELECTRONICS AND TELECOMMUNICATIONS RESEARCH INSTITUTE, Daejeon (KR)

(72) Inventors: Hyunho Park, Daejeon (KR); Eunjung Kwon, Daejeon (KR); Sungwon Byon, Daejeon (KR)

(73) Assignee: Electronics and Telecommunication Research Institute, Daejeon (KR)

( * ) Notice: Subject to any disclaimer, the term of this patent is extended or adjusted under 35 U.S.C. 154(b) by 209 days.

(21) Appl. No.: 17/875,270

(22) Filed: Jul. 27, 2022

(65) Prior Publication Data
US 2023/0031102 A1    Feb. 2, 2023

(30) Foreign Application Priority Data

Jul. 28, 2021 (KR) .................. 10-2021-0099420

(51) Int. Cl.
| | | |
|---|---|---|
| G06Q 10/10 | (2023.01) | |
| G06F 16/28 | (2019.01) | |
| G06N 5/022 | (2023.01) | |
| G06Q 10/06 | (2023.01) | |
| G06Q 30/02 | (2023.01) | |
| G06Q 30/06 | (2023.01) | |
| G06Q 40/08 | (2012.01) | |
| G06Q 50/26 | (2012.01) | |

(52) U.S. Cl.
CPC ......... G06Q 50/265 (2013.01); G06F 16/285 (2019.01); G06N 5/022 (2013.01)

(58) Field of Classification Search
CPC .... G06Q 50/265; G06F 16/285; G06N 5/022; G06N 3/045; G06N 3/09; G06N 3/0442; G06N 3/0464; G06N 20/20; G08B 25/016; G08B 21/10
USPC .......................................... 705/1.1–912, 325
See application file for complete search history.

(56) References Cited

U.S. PATENT DOCUMENTS

| | | | |
|---|---|---|---|
| 6,327,359 B1 | 12/2001 | Kang et al. | |
| 9,726,782 B2 * | 8/2017 | Cordazzo | ................. G01W 1/14 |
| 2013/0208712 A1 | 8/2013 | Lee et al. | |
| 2018/0053401 A1 * | 2/2018 | Martin | .................... H04M 11/04 |
| 2019/0354873 A1 * | 11/2019 | Pescarmona | ............. G06N 3/02 |

(Continued)

FOREIGN PATENT DOCUMENTS

| | | |
|---|---|---|
| KR | 101904817 B1 | 10/2018 |
| KR | 102069085 B1 | 1/2020 |
| KR | 1020210075511 A | 6/2021 |

*Primary Examiner* — Jonathan P Ouellette
(74) *Attorney, Agent, or Firm* — Rabin & Berdo, P.C

(57) ABSTRACT

Provided is a report data convergence analysis method for a disaster response. The method includes receiving first input data including report input data of a reporter, reception input data of a receiver, and report document input data that is prepared by the receiver after a disaster situation ends, storing the first input data in a first database, generating a plurality of first learning models through a learning process based on the first input data stored in the first database, and when the report input data of the reporter is received, performing convergence analysis on the plurality of generated first learning models to provide disaster situation information.

11 Claims, 6 Drawing Sheets

(56) References Cited

U.S. PATENT DOCUMENTS

2021/0334923 A1* 10/2021 Klein .................... G06Q 40/08
2021/0356625 A1* 11/2021 Mecikalski ............. G01W 1/10
2022/0036302 A1*  2/2022 Cella .................. G06Q 10/0835

* cited by examiner

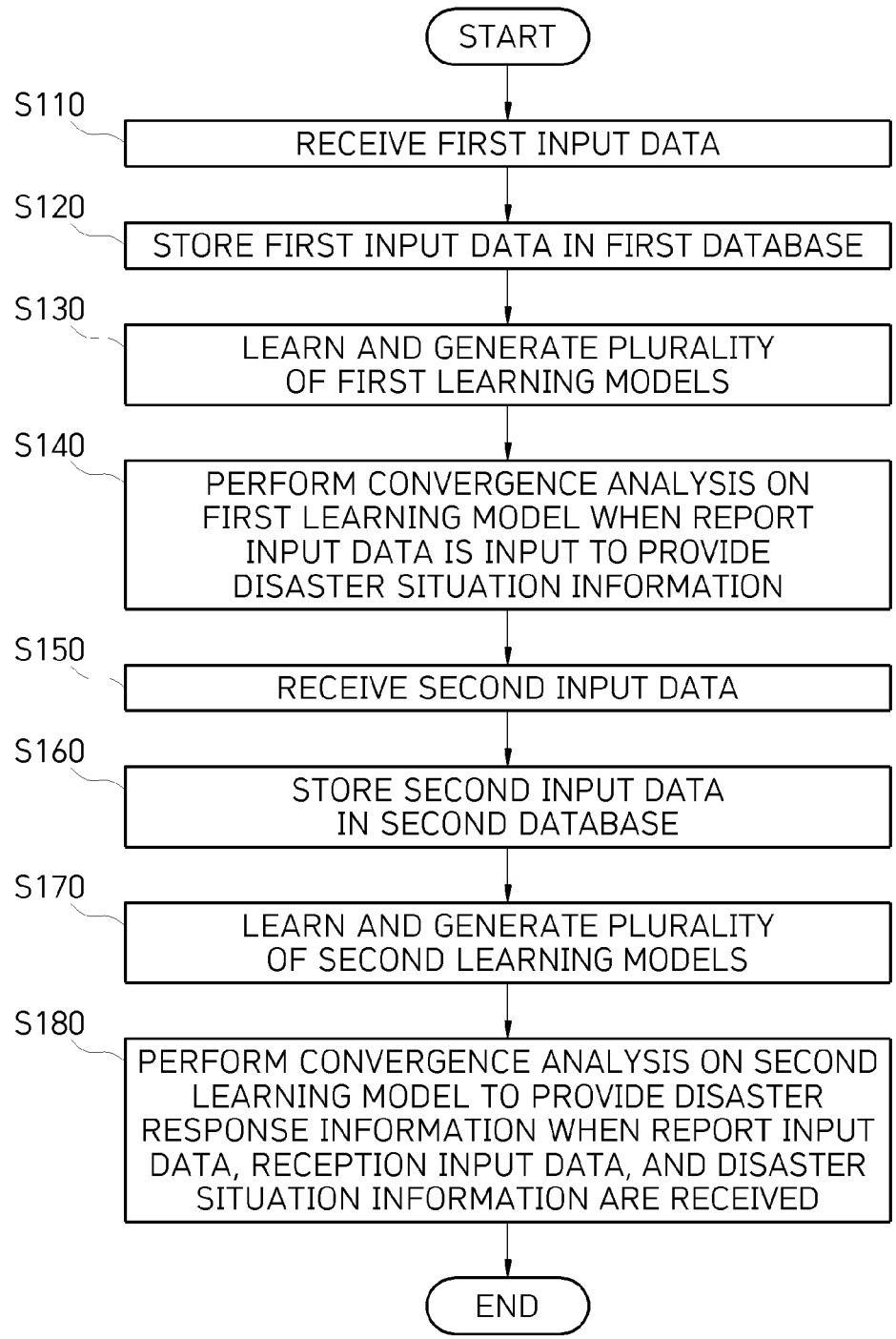

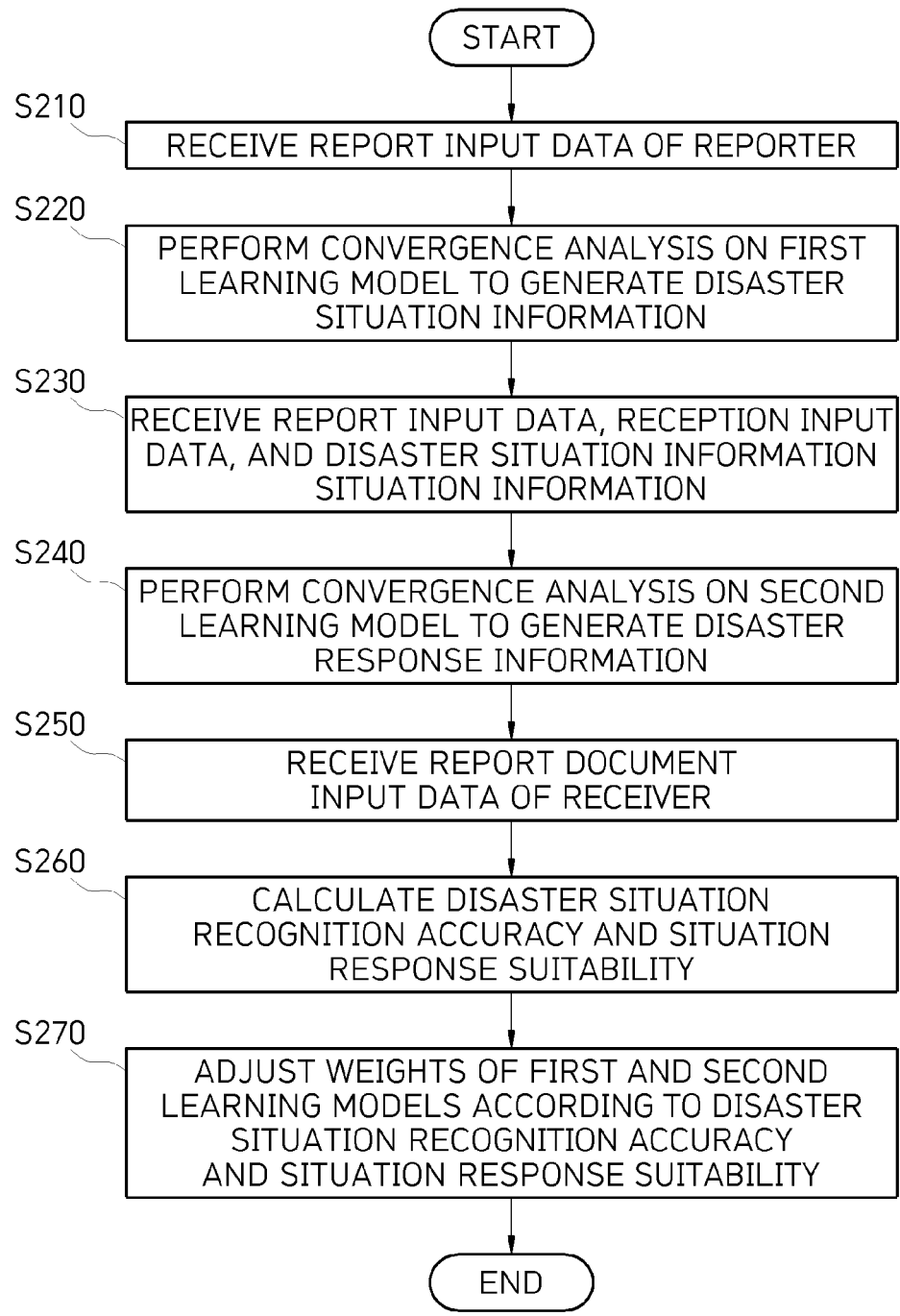

REPORT DATA CONVERGENCE ANALYSIS SYSTEM AND METHOD FOR DISASTER RESPONSE

CROSS-REFERENCE TO RELATED APPLICATION

This application claims priority to and the benefit of Korean Patent Application No. 10-2021-0099420, filed on Jul. 28, 2021, the disclosure of which is incorporated herein by reference in its entirety.

BACKGROUND

1. Field of the Invention

The present invention relates to a report data convergence analysis system and method for a disaster response, and more specifically, to a technique for recognizing disaster situations by performing convergence analysis on report data using a plurality of algorithms and providing customized response information for each related disaster situation.

2. Discussion of Related Art

When a disaster situation such as a fire occurs, an enormous amount of material or human damage occurs, and thus it is essential to receive a report and take response actions to the disaster situation rapidly and accurately.

However, when a report receiver receives a call from a reporter, the ability of the report receiver to understand the reported situation and a method of helping the reporter respond to the situation differ depending on the report receiver's ability.

Therefore, there is a need for a technique that supports a report receiver to take an effective emergency measure (responding to the reporter, communicating the situation, etc.), regardless of the competency of the report receiver such as the report receiver's ability and experience, in order to understand a situation of the reporter and take a response to the situation when the report receiver receives a call from the report.

SUMMARY OF THE INVENTION

The present invention is directed to providing a report data convergence analysis system and method for a disaster response, which are capable of supporting an effective emergency measure regardless of a receiver's ability and experience by analyzing and providing disaster situation information and disaster response information when the receiver receives report data.

However, objects to be solved by the present invention are not limited to the above-described objects and other objects may be present.

According to an aspect of the present invention, there is provided a report data convergence analysis method for a disaster response, including receiving first input data including report input data of a reporter, reception input data of a receiver, and report document input data that is prepared by the receiver after a disaster situation ends, storing the first input data in a first database, generating a plurality of first learning models through a learning process based on the first input data stored in the first database, and when the report input data of the reporter is received, performing convergence analysis on the plurality of generated first learning models to provide disaster situation information.

According to another aspect of the present invention, there is provided a report data convergence analysis method for a disaster response, including receiving report input data of a reporter, performing convergence analysis on a plurality of pre-learned first learning models to output disaster situation information, receiving the report input data, reception input data, and the disaster situation information, performing convergence analysis on a plurality of pre-learned second learning models to output disaster response information, receiving report document input data that is prepared by a receiver after a disaster situation ends, calculating disaster situation recognition accuracy and situation response suitability by comparing the disaster situation information and the disaster response information with the reception input data and the disaster situation information recorded in the report document input data, and adjusting each of weights of the first and second learning models according to the calculated disaster situation recognition accuracy and situation response suitability.

According to still another aspect of the present invention, there is provided a report data convergence analysis system for a disaster response, including a communication module configured to transmit or receive data to or from terminals of a reporter and a report receiver, a memory in which a program for generating disaster situation information and disaster response information according to the data is stored, and a processor configured to execute the program stored in the memory. In this case, as the processor executes the program, when the processor receives, through the communication module, first input data including report input data of a reporter, reception input data of a receiver, and report document input data that is prepared by the receiver after a disaster situation ends, the processor stores the first input data in a first database in the memory and generates a plurality of first learning models through a learning process based on the stored first input data, and when the processor receives the report input data of the reporter through the communication module, the processor performs convergence analysis on the plurality of generated first learning models to provide the disaster situation information.

According to yet another aspect of the present invention, there is provided a computer program which is combined with a computer, which is a type of hardware, to execute the report data convergence analysis method for a disaster response, and stored in a computer-readable recording medium.

Other specific details of the present invention are included in the detailed description and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 is a flowchart of a report data convergence analysis method for a disaster response according to an embodiment of the present invention; and FIG. 6 is a flowchart of a report data convergence analysis method for a disaster response according to another embodiment of the present invention.

DETAILED DESCRIPTION OF EXEMPLARY EMBODIMENTS

Figure 1:
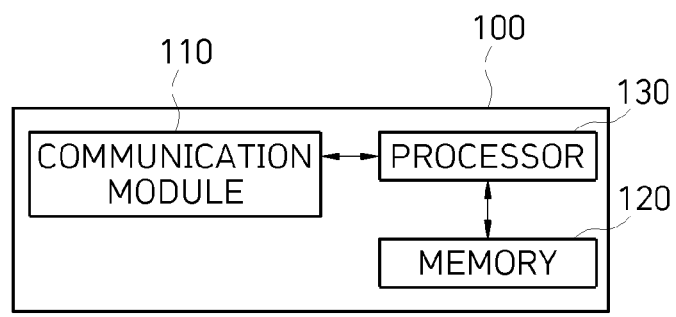
FIG. 1 is a block diagram of a report data convergence analysis system for a disaster response according to an embodiment of the present invention.

Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims.

Meanwhile, terms used herein are for the purpose of describing the embodiments and are not intended to limit the present invention. In this specification, the singular forms include the plural forms unless the context clearly indicates otherwise. It will be understood that the terms "comprise" and/or "comprising," when used herein, specify some stated components but do not preclude the presence or addition of one or more other components. Throughout this specification, the same reference numerals refer to the same elements, and the term "and/or" includes any and all combinations of one or more referents. It will be understood that, although the terms "first," "second," etc. may be used herein to describe various elements, these elements should not be limited by these terms. These terms are only used to distinguish one element from another. Therefore, a first element described below may be a second element within the technological scope of the present invention.

Unless otherwise defined, all terms (including technical and scientific terms) used herein can be used as is customary in the art to which the present invention belongs. Also, it will be further understood that terms, such as those defined in commonly used dictionaries, will not be interpreted in an idealized or overly formal sense unless expressly so defined herein.

FIG. 1 is a block diagram of a report data convergence analysis system 100 for a disaster response according to an embodiment of the present invention.

The present invention is to recognize a disaster situation by learning content of a report of a disaster situation of a reporter through an emergency call at National Fire Agency, a hospital, etc., content of a reception of response support of a report receiver for the disaster situation, and a final report document of the report receiver, which corresponds to the report, and to support a response appropriate to the disaster situation.

The report data convergence analysis system 100 for a disaster response according to the embodiment of the present invention includes a communication module 110, a memory 120, and a processor 130.

The communication module 110 transmits or receives data to or from terminals of the reporter and the report receiver. Such a communication module 110 may include both of a wired communication module and a wireless communication module. The wired communication module may be implemented using a power line communication device, a telephone line communication device, a cable home (the Multimedia over Coax Alliance (MoCA)), Ethernet, the Institute of Electrical and Electronics Engineers (IEEE) 1294, an integrated wired home network, or a Recommended Standard (RS)-485 control device. Further, the wireless communication module may be implemented using a wireless local area network (WLAN), Bluetooth, a high data rate wireless personal area network (HDR-WPAN), ultra-wideband (UWB), ZigBee, impulse radio, a 60 GHz frequency band WPAN, binary code-division multiple access (binary-CDMA), wireless Universal Serial Bus (USB) technology, wireless High-Definition Multimedia Interface (HDMI) technology, or the like.

A program for analyzing and generating disaster situation information and disaster response information according to the data received through the communication module 110 is stored in the memory 120. Further, the memory 120 includes first and second databases 221 and 231, and the data received through the communication module 110 is separated and stored in the first and second databases 221 and 231.

The processor 130 executes the program stored in the memory 120. When the processor 130 receives predetermined data from each of the reporter and the receiver through the communication module 110, the processor 130 learns a learning model based on the received predetermined data and generates the disaster situation information and the disaster response information.

Hereinafter, detailed functions performed by the respective components of FIG. 1 will be described with reference to FIG. 2.

Figure 2:
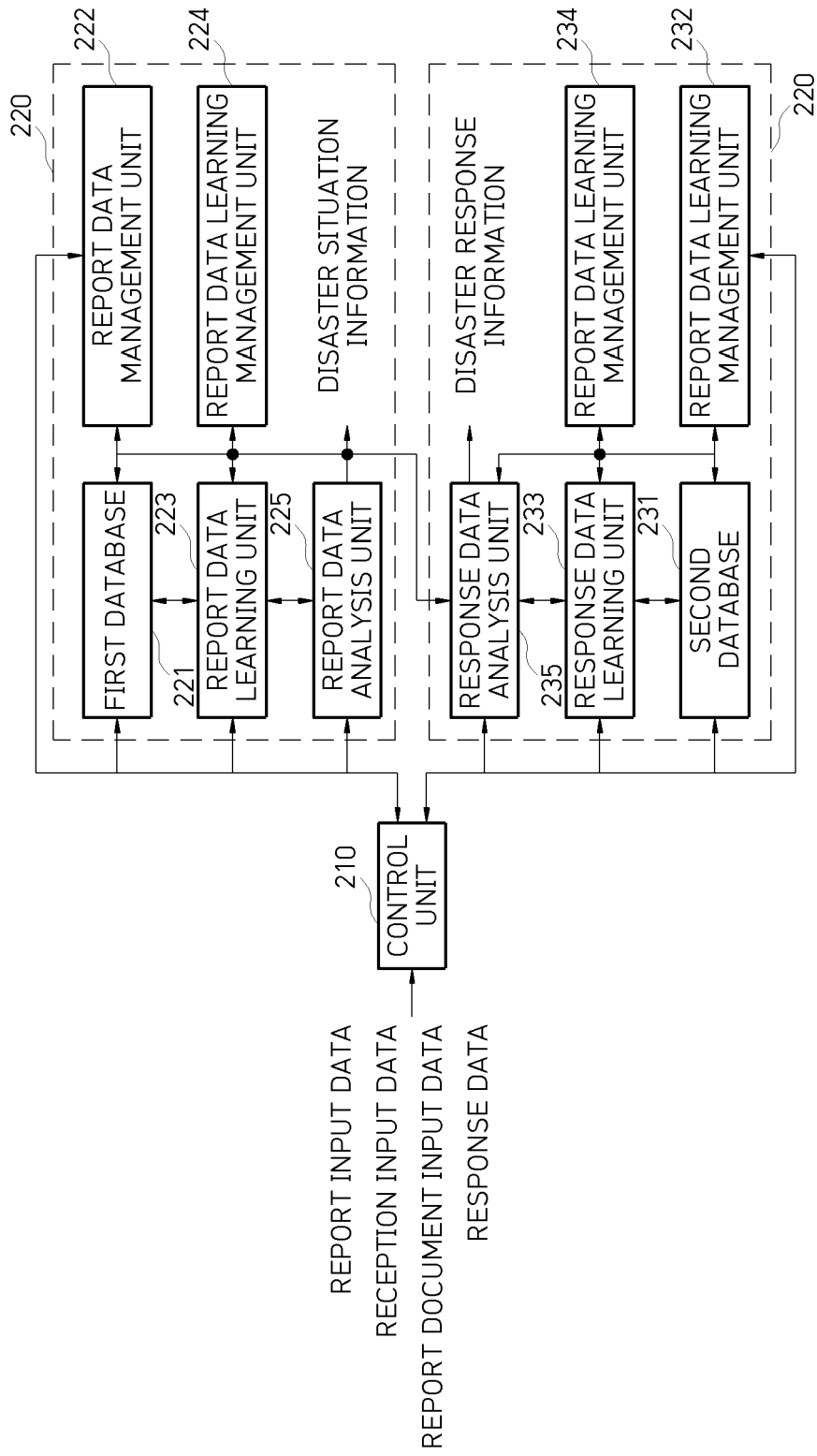
FIG. 2 is a diagram for functionally describing the report data convergence analysis system for a disaster response according to the embodiment of the present invention.

FIG. 2 is a diagram for functionally describing the report data convergence analysis system 100 for a disaster response according to the embodiment of the present invention.

The report data convergence analysis system 100 for a disaster response according to the embodiment of the present invention includes a control unit 210, a disaster situation information generation unit 220, and a disaster response information generation unit 230. In this case, the disaster situation information generation unit 220 includes a first database 221, a report data management unit 222, a report data learning unit 223, a report data learning management unit 224, and a report data analysis unit 225, and the disaster response information generation unit 230 includes a second database 231, a response data management unit 232, a response data learning unit 233, a response data learning management unit 234, and a response data analysis unit 235.

The control unit 210 recognizes a reported situation to generate disaster situation information and also generate disaster response information. The control unit 210 receives predetermined input data from each of the reporter and the receiver, and in this case, the input data includes report input data of the reporter, reception input data of the receiver, report document input data prepared by the receiver after a disaster situation ends, and response input data.

The report input data of the reporter is data that the reporter reports about the disaster situation, and for example, a reported voice may be converted into text data through speech to text (STT) and be input.

The reception input data of the receiver is text data that is converted through STT from a voice of the receiver who receives the report from the reporter. The report document input data of the receiver is text data serving as a final report prepared and input by the receiver after the reported disaster situation ends. The report document input data includes report information and receipt information, that is, the report input data and the reception input data, which is each divided by an identifier.

The response input data is response data for each disaster situation and may be configured in the form of structured or unstructured data. For example, a disaster response standard operation procedure (SOP), which describes how the National Fire Agency responds to disaster situations, data on disaster situation response tips included in the Internet postings, or the like may correspond to the response input data.

First, in an embodiment of the present invention, a process of generating and providing, by the control unit 210 and the disaster situation information generation unit 220, the disaster situation information will be described as follows.

The control unit 210 first performs a learning process on a first learning model. To this end, when the control unit 210 receives first input data including the report input data of the reporter, the reception input data of the receiver, and the report document input data prepared by the receiver after the disaster situation ends, the control unit 210 stores the first input data in the first database 221.

In an embodiment, the control unit 210 may group the report input data, the reception input data, and the report document input data according to an incident identifier, and store the grouped first input data in the first database 221.

Further, the control unit 210 may match and store the report input data, the reception input data, and the report document input data each with at least one of disaster situation classification information and disaster situation analysis information in the first database 221.

Here, the disaster situation classification information may be provided by being classified into, for example, a large category of disaster situations such as fire, rescue, first aid, etc. and a detailed category of disaster situations such as forest fires, factory fires, etc. Alternatively, predetermined classification information classified into a large category, a medium category, or a small category may be configured and managed in a tree form. The disaster situation analysis information is information necessary to understand the disaster situation in detail, and may include information on injured persons, information on fire-causing substances, and the like.

The report data management unit 222 manages the first input data stored in the first database 221. That is, the report data management unit 222 manages the storage of the report input data, the reception input data, and the report document input data in the first database 221.

Further, the report data management unit 222 performs a change operation such as addition, correction, deletion, etc. of the report input data, the reception input data, and the report document input data which are stored in the first database 221.

As another embodiment, the report data management unit 222 may augment the first input data stored in the first database 221. That is, the report data management unit 222 may expand data required for learning through a data augmentation function.

The above-described control unit 210 may transmit a control command for controlling the change or augmentation of the first input data stored in the first database 221 to the report data management unit 222 through a predetermined interface. Accordingly, the report data management unit 222 may request and receive the first input data stored in the first database 221 through the interface.

Next, the report data learning unit 223 generates a plurality of first learning models for disaster situation analysis through a learning process based on the first input data stored in the first database 221. In this case, the control unit 210 transmits and controls a predetermined range of first input data to be learned and learning request information to the report data learning unit 223 through the interface.

In this case, examples of the learning request information may include information on a learning-related algorithm such as a convolutional neural network (CNN), a recurrent neural network (RNN), a long short-term memory (LSTM), or the like, and information on parameters such as a batch size, the number of hidden layers, a learning rate, and the like.

The report data learning unit 223 generates the plurality of first learning models by learning the first input data received from the first database 221. In this case, the report data learning unit 223 may calculate performance indicators such as accuracy and F1 score of the generated first learning models.

The report data learning management unit 224 receives, stores, and manages the plurality of first learning models and the performance indicators, which are generated by the report data learning unit 223, through the interface. That is, the report data learning management unit 224 stores and manages identifier information of the plurality of first learning models, the information on the learning model algorithm (e.g., CNN, RNN, LSTM, etc.), the information on the learning model parameters (e.g., batch size, number of hidden layers, learning rate, etc.), and the performance indicators (e.g., accuracy, F1 score, etc.) for each learning model.

As an embodiment, the report data learning management unit 224 calculates disaster situation recognition accuracy indicating disaster situation recognition performance for each generated first learning model, and calculates and stores a weight for convergence analysis of the first learning model based on the disaster situation recognition accuracy.

For example, the report data learning management unit 224 may calculate the weight for each of the plurality of first learning models using Equation 1.

$$W_i = \frac{A_i}{\sum_{n=1}^{N} A_n} \qquad \text{[Equation 1]}$$

Referring to Equation 1, when convergence analysis is performed on a total of N first learning models, a weight $W_i$ of an $i^{th}$ first learning model $M_i$ may be calculated as a ratio of accuracy $A_i$ of a first learning model $M_i$ to the sum of disaster situation recognition accuracy of all the first learning models.

The control unit 210 controls the report data learning management unit 224 to store and manage the identifier information of the first learning model, the information on the learning model algorithm, the information on the learning model parameters, and the performance indicators for each learning model, to calculate the weight for each learning model, and to store the weight for each learning model, through the interface.

After the learning process performed on the first learning models is completed, when the report data analysis unit 225 receives the report input data of the reporter, the report data analysis unit 225 performs convergence analysis based on the plurality of first learning models learned through the report data learning unit 223 to provide disaster situation information. In this case, the control unit 210 transmits the report input data through the interface and controls the report data analysis unit 225 to perform convergence analysis.

Figure 3:
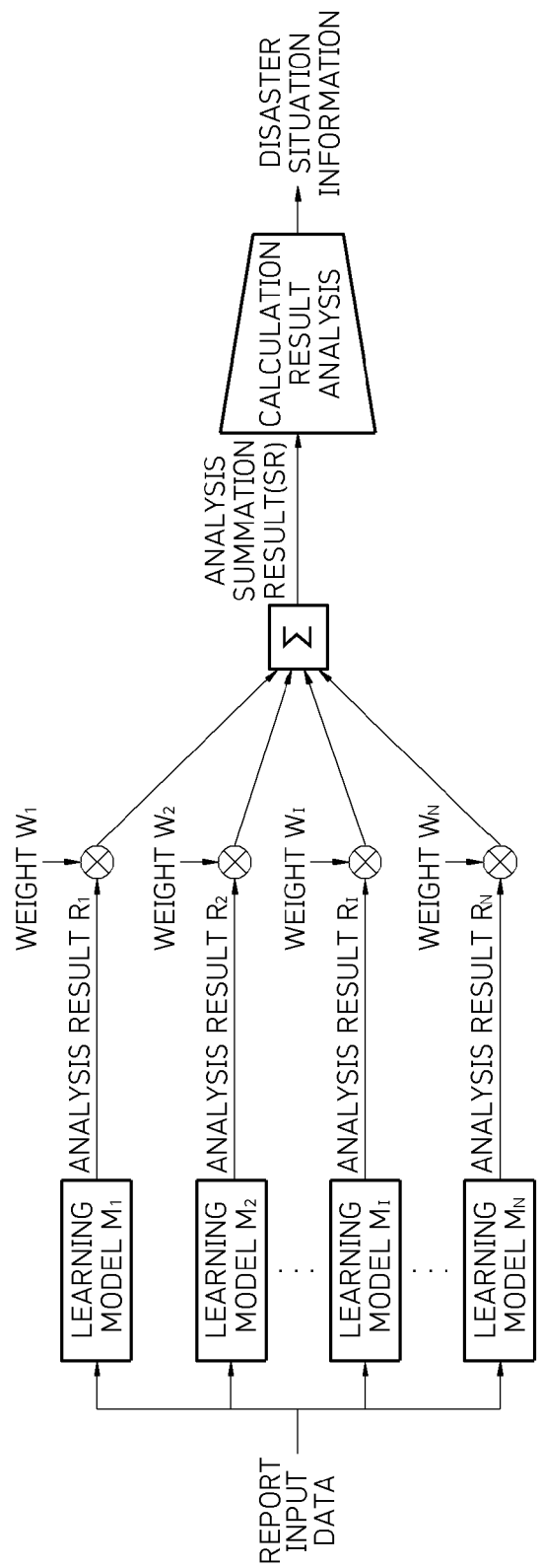
FIG. 3 is a diagram for describing a convergence analysis process performed by a report data analysis unit.

FIG. 3 is a diagram for describing a convergence analysis process performed by the report data analysis unit 225.

Specifically, when the report data analysis unit 225 receives the report input data of the reporter from the control unit 210, the report data analysis unit 225 receives the plurality of learned first learning models from the report data learning unit 223, receives the calculated weights from the report data learning management unit 224, and then calculates the disaster situation information based on the report input data, the plurality of first learning models, and the weights.

FIG. 3 is a diagram illustrating the convergence analysis process performed by the report data analysis unit 225, and the report input data is input to each of a plurality of first learning models $M_1$ to $M_N$ to obtain analysis results $R_1$ to $R_N$. Then, the report data analysis unit 225 receives calculated weights $W_1$ to $W_N$ from the report data learning management unit 224, and then applies the calculated weights $W_1$ to $W_N$ to the analysis results $R_1$ to $R_N$, respectively. Thereafter, the report data analysis unit 225 sums (SR) the analysis results to which the weights $W_1$ to $W_N$ are applied, respectively, and provides the disaster situation information. In this case, the disaster situation information may be a disaster situation classification result, and may include information such as the number of fatalities, the number of injuries, and injury details of the injuries, which specifically indicate the disaster situation.

Next, in an embodiment of the present invention, a process of generating and providing, by the control unit 210 and the disaster response information generation unit 230, disaster situation information will be described as follows.

The control unit 210 first performs a learning process on a second learning model. To this end, the control unit 210 receives second input data including the first input data and response data for each disaster situation. That is, when the control unit 210 receives the second input data, which includes the report input data of the reporter, the reception input data of the receiver, and the report document input data as the first input data and includes the response data for each disaster situation, the control unit 210 stores the response input data in the second database 231.

The response data management unit 232 manages the second input data stored in the second database 231. That is, the response data management unit 232 manages the storage of the report input data, the reception input data, the report document input data, and the response data for each disaster situation in the second database 231.

Further, the response data management unit 232 may perform a change operation such as addition, correction, deletion, etc. of the second input data stored in the second database 231.

As another embodiment, the response data management unit 232 may augment the second input data stored in the second database 231. That is, the response data management unit 232 may expand data required for learning through a data augmentation function.

The above-described control unit 210 may transmit a control command for controlling the change or augmentation of the second input data stored in the second database 231 to the response data management unit 232 through a predetermined interface. Accordingly, the response data management unit 232 may request or receive the second data stored in the second database 231 through the interface.

Next, the response data learning unit 233 generates a plurality of second learning models for response analysis through the learning process based on the second input data stored in the second database 231. In this case, the control unit 210 may transmit and control a predetermined range of second input data to be learned and learning request information to the response data learning unit 233 through the interface.

In this case, examples of the learning request information may include information on a learning-related algorithm such as CNN, RNN, LSTM, or the like, and information on parameters such as a batch size, the number of hidden layers, a learning rate, and the like.

The response data learning unit 233 generates the plurality of second learning models by learning the second input data received from the second database 231. In this case, the response data learning unit 233 may calculate performance indicators such as accuracy and F1 score of the generated second learning models.

The response data learning management unit 234 receives, stores, and manages the plurality of generated second learning models and the performance indicators, which are generated by the response data learning unit 233, through the interface. That is, the response data learning management unit 234 stores and manages identifier information of the plurality of second learning models, the information on the learning model algorithm (e.g., CNN, RNN, LSTM, etc.), the information on the learning model parameters (e.g., batch size, number of hidden layers, learning rate, etc.), and the performance indicators (e.g., accuracy, F1 score, etc.) for each learning model.

As an embodiment, the response data learning management unit 234 performs evaluation on situation response performance such as situation response suitability for evaluating whether a response to the situation is appropriate, for each generated second learning model, and calculates and stores a weight for convergence analysis of the second learning model based on the situation response suitability.

For example, the report data learning management unit 224 may calculate the weight for each of the plurality of second learning models using Equation 1 described above.

Referring to Equation 1, when the convergence analysis is performed on a total of N second learning models, a weight $W_i$ of an $i^{th}$ second learning model $M_i$ may be calculated as a ratio of accuracy $A_i$ of a second learning model $M_i$ to the sum of disaster situation recognition accuracy of all the second learning models.

The control unit 210 controls the response data learning management unit 234 to store and manage the identifier information of the second learning model, the information on the learning model algorithm, the information on the learning model parameter, and the performance indicators for each learning model, to calculate the weight for each learning model, and to store the weight for each learning model, through the interface.

After the learning process performed on the second learning model is completed, when the report input data of the reporter, the reception input data, and the disaster situation information are received, the response data analysis unit 235 performs convergence analysis based on the plurality of second learning models learned through the response data learning unit 233 to provide disaster response information. In this case, the control unit 210 transmits the report input data, the reception input data, and the disaster situation information through the interface and controls the response data analysis unit 235 to perform convergence analysis.

Figure 4:
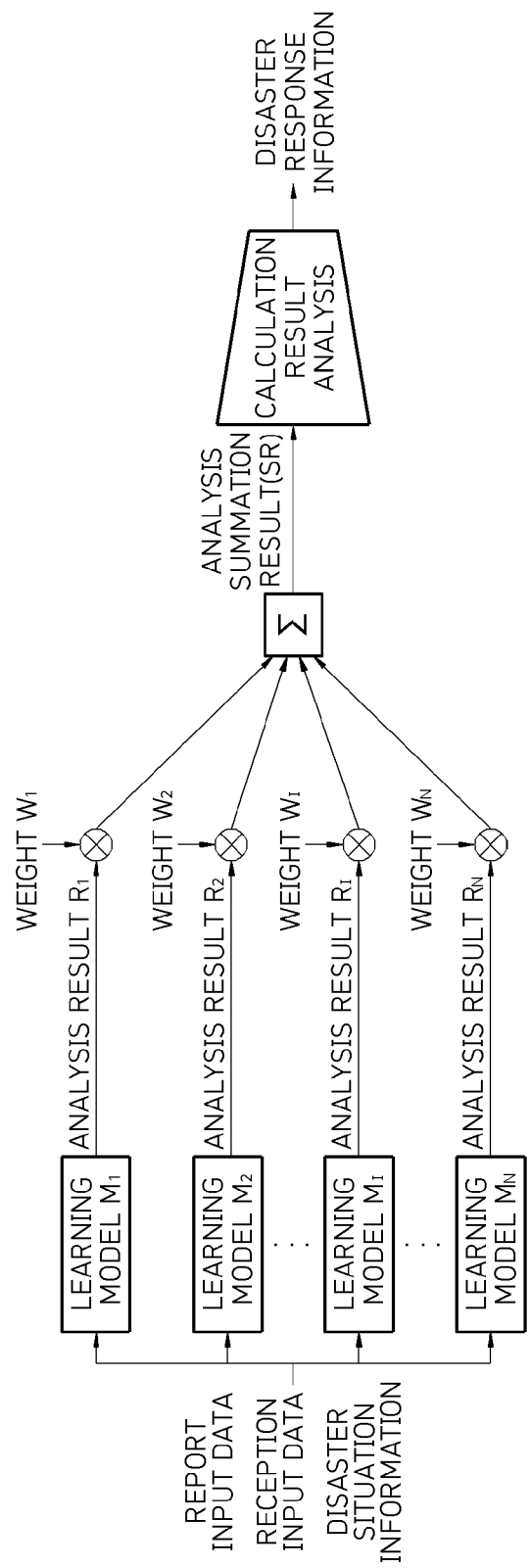
FIG. 4 is a diagram for describing a convergence analysis process performed by a response data analysis unit.

FIG. 4 is a diagram for describing a convergence analysis process performed by the response data analysis unit 235.

Specifically, when the response data analysis unit 235 receives the report input data, the reception input data, and the disaster situation information from the control unit 210, the response data analysis unit 235 receives the plurality of learned second learning models from the response data learning unit 233, receives the calculated weights from the response data learning management unit 234, and then calculates the disaster response information based on the report input data, the reception input data, the disaster situation information, the plurality of second learning models, and the weights.

FIG. 4 is a diagram illustrating the convergence analysis process performed by the response data analysis unit 235, and the report input data, the reception input data, and the disaster situation information are input to each of a plurality of second learning models $M_1$ to $M_N$ to obtain analysis results $R_1$ to $R_N$. Then, the response data analysis unit 235 receives calculated weights $W_1$ to $W_N$ from the response data learning management unit 234, and then applies the calculated weights $W_1$ to $W_N$ to the analysis results $R_1$ to $R_N$, respectively. Thereafter, the response data analysis unit 235 sums (SR) the analysis results to which the weights $W_1$ to $W_N$ are applied, respectively, and provides the disaster response information. In this case, the disaster response information includes description information required for a response to the disaster.

Hereinafter, a report data convergence analysis method for a disaster response according to an embodiment of the present invention will be described with reference to FIG. 5.

FIG. 5 is a flowchart of a report data convergence analysis method for a disaster response according to an embodiment of the present invention.

In the report data convergence analysis method for a disaster response according to the embodiment of the present invention, first input data, which includes report input data of a reporter, reception input data of a receiver, and report document input data prepared by the receiver after a disaster situation ends, is first received (S110), and the first input data is stored in a first database 221 (S120).

Next, a plurality of first learning models are generated through a learning process based on the first input data stored in the first database 221 (S130).

Next, when the report input data of the reporter is received, the disaster situation information is provided by performing convergence analysis on the plurality of generated first learning models (S140).

Further, in an embodiment of the present invention, second input data, which includes the first input data and response data for each disaster situation, is received (S150), and the second input data is stored in a second database 231 (S160).

Next, a plurality of second learning models are generated through a learning process based on the second input data stored in the second database 231 (S170), and when the report input data, the reception input data, and the disaster situation information are received, the disaster response information is generated by performing convergence analysis on the plurality of generated second learning models (S180).

FIG. 6 is a flowchart of a report data convergence analysis method for a disaster response according to another embodiment of the present invention, and illustrates a procedure from reporting a disaster situation to a response to the disaster situation and performance evaluation after the response.

First, report input data of a reporter is received (S210). In the report input data receiving operation, the report input data obtained by converting a report call through STT is received. Next, the control unit 210 transmits the report input data to the report data analysis unit 225 to perform convergence analysis on a plurality of pre-learned first learning models and generate disaster situation information, and the generated disaster situation information is displayed (S220).

The displayed disaster situation information may be input to the system according to the determination of the receiver, or information other than the disaster situation information displayed according to the determination of the receiver may be input to the system.

Next, when the report input data, reception input data, and the disaster situation information are received (S230), disaster response information is generated by performing convergence analysis on a plurality of pre-learned second learning models, and the generated disaster response information is displayed (S240).

The displayed disaster response information may be input to the system according to the determination of the receiver, or information other than the disaster response information displayed according to the determination of the receiver may be input to the system.

Next, report document input data prepared by the receiver after the disaster situation ends is received (S250).

Next, the report data learning management unit 224 calculates disaster situation recognition accuracy by comparing the disaster situation information with reception input data and the disaster situation information recorded in the report document input data, and the response data learning management unit 234 calculates situation response suitability by comparing the disaster response information with the reception input data and the disaster response information recorded in the report document input data (S260).

Next, weights of the first and second learning models each are adjusted according to the calculated disaster situation recognition accuracy and situation response suitability (S270). In such a way, in an embodiment of the present invention, by adjusting the weights, it is possible to gradually improve performance of disaster recognition and disaster response.

Meanwhile, operations S110 to S270 in the above description may be further divided into additional operations or combined in fewer operations in some embodiments of the present invention. Further, some operations may be omitted as necessary, and the order of the operations may be changed. In addition, the contents of FIGS. 1 to 4, even when omitted, may also be applied to the report data convergence analysis method for a disaster response of FIGS. 5 and 6.

The embodiments of the present invention described above may be implemented as a program (or an application) to be executed in combination with a server, which is a type of hardware, and may be stored in a medium.

In order for a computer to read the program and execute the above methods implemented as programs, the above-described program may include code coded in a computer language such as C, C++, JAVA, Ruby, or machine language that may be read by a processor (a central processing unit (CPU)) of the computer through a device interface of the computer. The code may include functional code related to functions that define necessary functions for executing the methods and the like, and include control code related to an execution procedure necessary for the processor of the computer to execute the functions according to a predetermined procedure. Further, the code may further include additional information required for the processor of the computer to execute the functions, or code related to memory reference to which a location (address) of an internal or external memory of the computer should be referenced. Further, when the processor of the computer needs to communicate with any other computer or server at a remote location in order to execute the functions, the code may further include code related to communication for how to communicate with any other computers or servers at remote locations using a communication module of the computer and for what information or media should be transmitted and received during communication.

The storage medium is not a medium in which data is stored for a short moment, such as a register, a cache, a memory, etc., but is a medium in which data is stored semi-permanently and is readable by a device. Specifically, examples of the storage medium include a read only memory (ROM), a random-access memory (RAM), a compact disc ROM (CD-ROM), a magnetic tape, a floppy disk, an optical data storage device, and the like, but the present invention is not limited thereto. That is, the program may be stored in various recording media on various servers to which the computer may access or may be stored in various recording media of the user's computer. Further, the media may be distributed over computer systems connected through a network, and computer-readable codes may be stored in a distributed manner.

The above description of the present invention is only exemplary, and it will be understood by those skilled in the art that various modifications can be made without departing from the technical scope of the present invention and without changing essential features. Therefore, the above-described embodiments should be considered in a descriptive sense only and not for purposes of limitation. For example, each component described as a single type may be realized in a distributed manner, and similarly, components that are described as being distributed may be realized in a coupled manner.

According to the embodiments of the present invention, it is possible to gradually improve disaster situation recognition and response performance by continuously managing report data and analysis models for disaster situation recognition and disaster situation response.

Effects of the present invention are not limited to the above-described effect and other unmentioned effects may be clearly understood by those skilled in the art from the above descriptions.

The scope of the present invention is defined not by the above description but by the following claims, and it should be understood that all changes or modifications derived from the scope and equivalents of the claims fall within the scope of the present invention.

What is claimed is:

1. A report data convergence analysis method for a disaster response to a disaster, the report data convergence analysis method comprising:
    receiving first input data including report input data of a reporter, reception input data of a receiver, and report document input data that is prepared by the receiver after a disaster situation ends;
    storing the first input data in a first database;
    expanding data required for learning by augmenting the first input data stored in the first database;
    generating a plurality of first learning models through a learning process based on the first input data stored in the first database;
    calculating disaster situation recognition accuracy indicating disaster situation recognition performance for each generated first learning model;
    receiving second input data including the first input data and response data for each disaster situation;
    storing the second input data in a second database;
    further expanding the data required for learning by augmenting the second input data stored in the second database;
    generating a plurality of second learning models through a learning process based on the second input data stored in the second database;
    when the report input data of the reporter is received, performing convergence analysis on the plurality of generated first learning models to provide disaster situation information; and
    when the report input data, the reception input data, and the disaster situation information are received, performing convergence analysis on the plurality of generated second learning models to generate further disaster response information;
    wherein the generating of the plurality of first learning models through the learning process based on the first input data stored in the first database includes calculating a weight for convergence analysis of the first learning models based on the disaster situation recognition accuracy calculated for each generated first learning model; and
    wherein the generating of the plurality of second learning models through the learning process based on the second input data stored in the second database includes calculating a weight for convergence analysis of the second learning models based on situation response suitability for each generated second learning model;
    the report data convergence analysis method further comprising adjusting the weights of the first learning models and the weights of the second learning models according to the disaster situation recognition accuracy and the situation response suitability;
    wherein the disaster situation information includes information required for a response to the disaster.

2. The report data convergence analysis method of claim 1, wherein the storing of the first input data in the first database includes:
    grouping the report input data, the reception input data, and the report document input data according to an incident identifier; and
    storing the grouped first input data in the first database.

3. The report data convergence analysis method of claim 1, wherein, in the storing of the first input data in the first database, the report input data, the reception input data, and the report document input data are each matched with at least one of disaster situation classification information and disaster situation analysis information and stored.

4. The report data convergence analysis method of claim 1, wherein, when the report input data of the reporter is received, the providing of the disaster situation information by performing the convergence analysis on the plurality of generated first learning models includes:
    receiving the report input data of the reporter;
    inputting the report input data to each of the plurality of first learning models and obtaining analysis results;
    applying each calculated weight to each analysis result; and
    summing the analysis results, to which the weights are applied, to provide the disaster situation information.

5. The report data convergence analysis method of claim 1, wherein, when the report input data, the reception input data, and the disaster situation information are received, the generating of the disaster response information by performing the convergence analysis on the plurality of generated second learning models includes:
receiving the report input data, the reception input data, and the disaster situation information;
inputting the report input data, the reception input data, and the disaster situation information to each of the plurality of second learning models and obtaining analysis results;
applying each calculated weight to each analysis result; and
summing the analysis results, to which the weights are applied, to calculate the disaster response information.

6. A report data convergence analysis method for a disaster response to a disaster, the report data convergence analysis method comprising:
receiving report input data of a reporter;
expanding data required for learning by augmenting the report input data;
based on the augmented report input data, performing convergence analysis on a plurality of pre-learned first learning models to output disaster situation information;
receiving the report input data, reception input data, and the disaster situation information;
further expanding the data required for learning by augmenting the augmented report input data, the reception input data, and the disaster situation information;
based on the augmented report input data, the reception input data, and the disaster situation information, performing convergence analysis on a plurality of pre-learned second learning models to output disaster response information;
receiving report document input data that is prepared by a receiver after a disaster situation ends;
calculating disaster situation recognition accuracy and situation response suitability by comparing the disaster situation information and the disaster response information with the reception input data and the disaster situation information recorded in the report document input data; and
adjusting each of weights of the first and second learning models according to the calculated disaster situation recognition accuracy and situation response suitability;
wherein the disaster situation information includes information required for a response to the disaster.

7. A report data convergence analysis system for a disaster response to a disaster, the report data convergence analysis system comprising:
a wired or wireless communication module configured to transmit or receive data to or from terminals of a reporter and a report receiver;
a memory in which a program for generating disaster situation information and disaster response information according to the data is stored, and
a processor configured to execute the program stored in the memory,
wherein, as the processor executes the program, when the processor receives, through the communication module, first input data including report input data of a reporter, reception input data of a receiver, and report document input data that is prepared by the receiver after a disaster situation ends, the processor stores the first input data in a first database in the memory, expands data required for learning by augmenting the first input data stored in the first database, generates a plurality of first learning models through a learning process based on the stored first input data, and calculates disaster situation recognition accuracy indicating disaster situation recognition performance for each generated first learning model; and
when the processor receives the report input data of the reporter through the communication module, the processor performs convergence analysis on the plurality of generated first learning models to provide the disaster situation information;
wherein the processor calculates a weight for convergence analysis of the first learning models based on the disaster situation recognition accuracy for each generated first learning model;
wherein, when the processor receives second input data including the first input data and response data for each disaster situation through the communication module, the processor stores the second input data in a second database, further expands the data required for learning by augmenting the second input data stored in the second database, and generates a plurality of second learning models through a learning process based on the stored second input data, and when the processor receives the report input data, the reception input data, and the disaster situation information, the processor performs convergence analysis on the plurality of generated second learning models to provide the disaster response information;
wherein the processor calculates a weight for convergence analysis of the second learning models based on situation response suitability for each generated second learning model;
wherein the processor adjusts the weights of the first learning models and the weights of the second learning models according to the disaster situation recognition accuracy and the situation response suitability; and
wherein the disaster situation information includes information required for a response to the disaster.

8. The report data convergence analysis system of claim 7, wherein the processor groups the report input data, the reception input data, and the report document input data according to an incident identifier, and stores the grouped first input data in the first database.

9. The report data convergence analysis system of claim 7, wherein the processor matches and stores the report input data, the reception input data, and the report document input data each with at least one of disaster situation classification information and disaster situation analysis information.

10. The report data convergence analysis system of claim 7, wherein, when the processor receives the report input data of the reporter, the processor inputs the report input data to each of the plurality of first learning models and obtains analysis results, applies each calculated weight to each analysis result, and sums the analysis results, to which the weights are applied, to calculate the disaster situation information.

11. The report data convergence analysis system of claim 7, wherein, when the processor receives the report input data, the reception input data, and the disaster situation information, the processor inputs the report input data, the reception input data, and the disaster situation information to each of the plurality of second learning models and obtains analysis results, applies each calculated weight to each analysis result, and sums the analysis results, to which the weights are applied, to calculate the disaster situation information.

* * * * *